June 28, 1966  J. W. GOODYEAR  3,257,871
CIRCULAR HOLE CUTTERS
Filed May 6, 1963                                       4 Sheets-Sheet 1
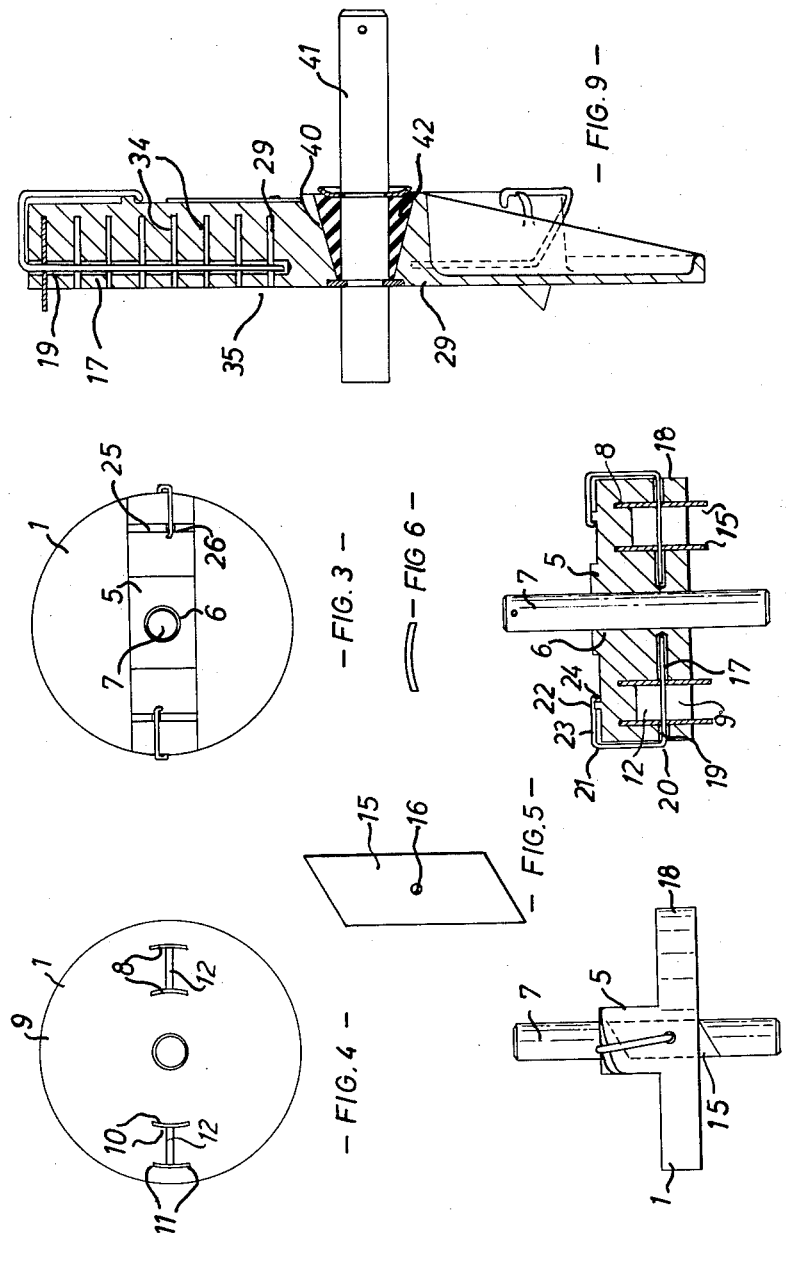
INVENTOR:
JAMES W. GOODYEAR
BY
Browne, Schuyler & Beveridge
ATTORNEYS June 28, 1966  J. W. GOODYEAR  3,257,871
CIRCULAR HOLE CUTTERS
Filed May 6, 1963  4 Sheets-Sheet 2
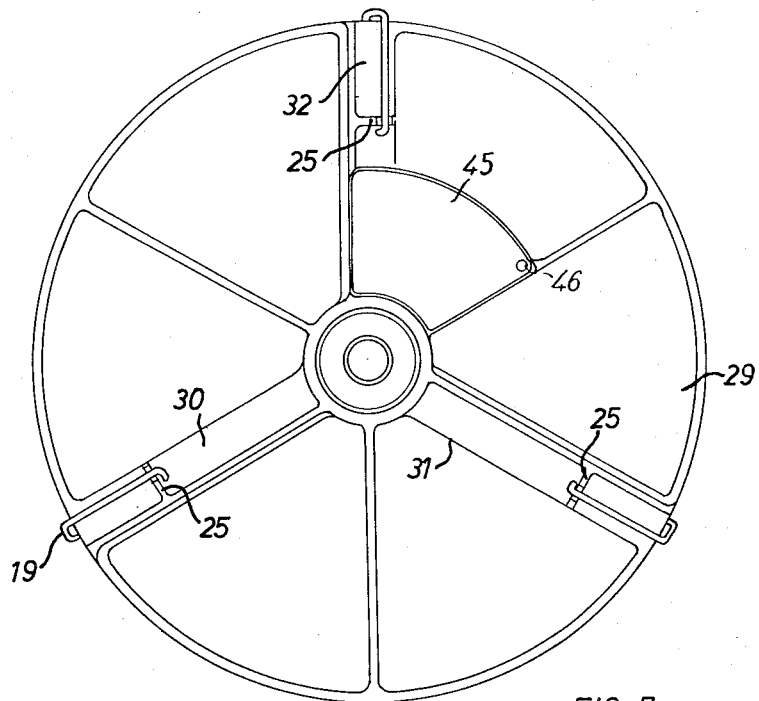
— FIG. 7 —
INVENTOR:
JAMES W GOODYEAR
BY
ATTORNEYS June 28, 1966   J. W. GOODYEAR   3,257,871
CIRCULAR HOLE CUTTERS
Filed May 6, 1963   4 Sheets-Sheet 3
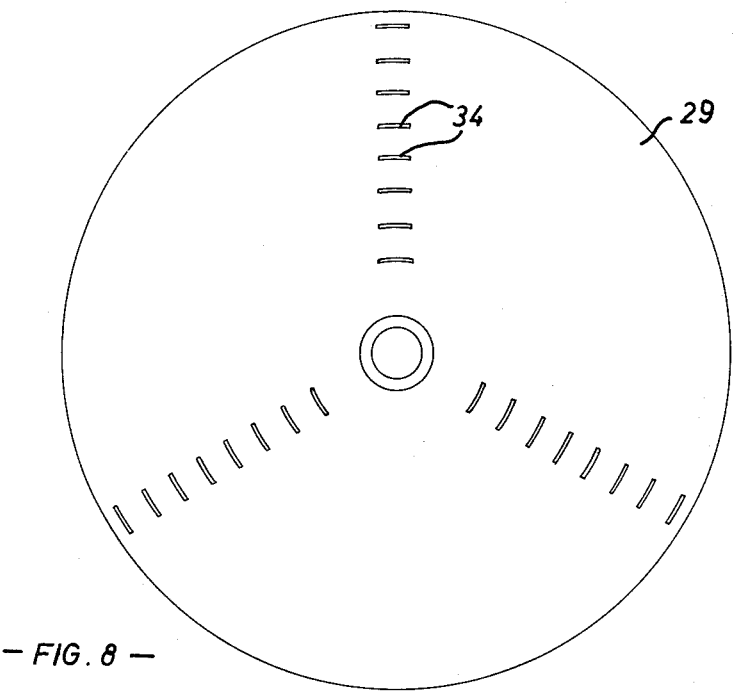
– FIG. 8 –
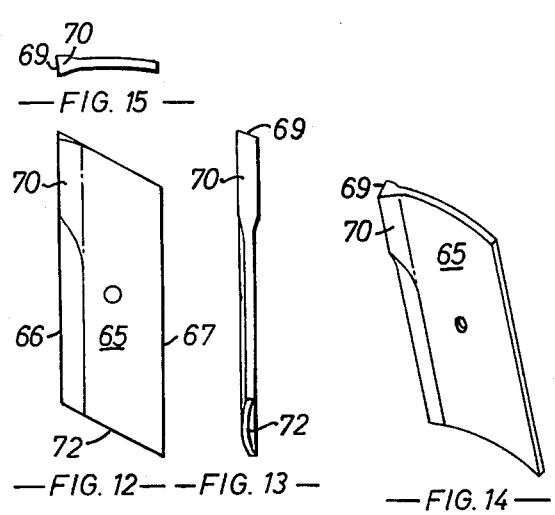
– FIG. 15 –
– FIG. 12 –   – FIG. 13 –   – FIG. 14 –
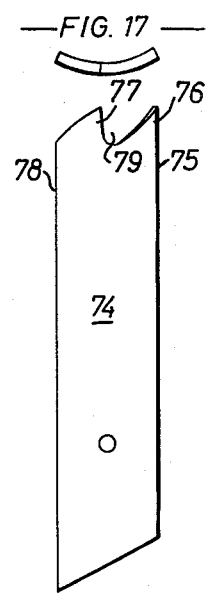
– FIG. 17 –
– FIG. 16 –
INVENTOR:
JAMES W. GOODYEAR
BY
Browne, Schuyler & Burridge
ATTORNEYS

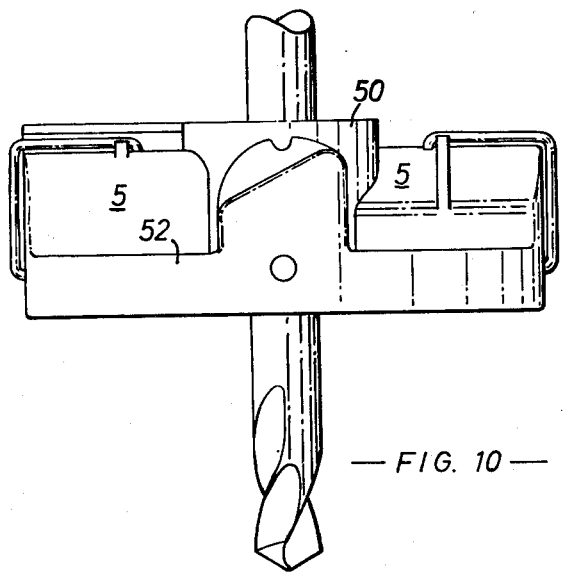
— FIG. 10 —
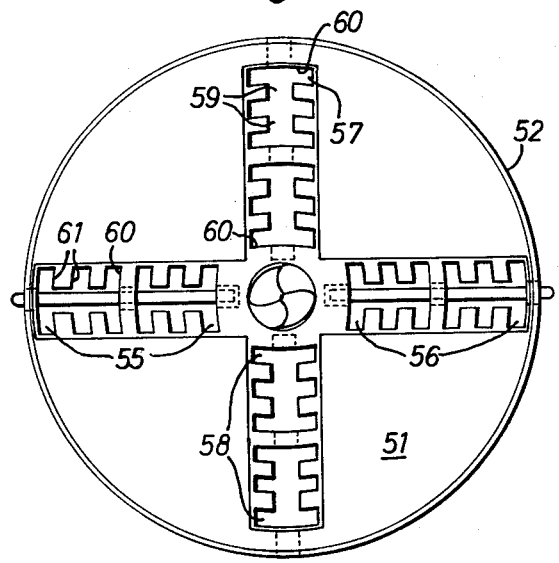
— FIG. 11 —
INVENTOR:
JAMES W. GOODYEAR
BY
ATTORNEYS

United States Patent Office 3,257,871
Patented June 28, 1966

3,257,871
CIRCULAR HOLE CUTTERS
James Wallis Goodyear, Falmouth, Cornwall, England, assignor to The Cuttahead Company Limited, Cornwall, England
Filed May 6, 1963, Ser. No. 278,056
Claims priority, application Great Britain, May 12, 1962, 18,353/62
7 Claims. (Cl. 77—79)

The present invention relates to circular hole cutters of the type in which a cutting element is moved in a circular path about the axis or centre of the hole to be cut. Such cutters are particularly useful for cutting holes in sheet material such for example as sheet metal and plywood and are usually provided with a centering device about which the cutting element describes its circular movement and which may comprise a spindle which fits in a pilot hole drilled in the material to be cut.

According to the present invention a cutterhead is adapted for rotation about a given axis and has a number of substantially axially extending blade receiving slots therein located at different distances from said axis, each slot being open at one end to enable a blade to protrude therefrom and being bounded by opposed substantially axially extending widthwise walls adapted to face the faces of a blade received therein and by opposed substantially axially extending edgewise walls or slot edges adapted to face the edges of the blade, each slot being of much greater dimension widthwise than edgewise and being disposed in the head so as to enable the blade to be driven by the head mainly or entirely by thrust applied to an edge of the blade by one of said edgewise walls or edges of the slot. The widthwise walls of each slot are preferably substantially perpendicular to the radial direction of the head.

According to another aspect of the invention a cutterhead is adapted for rotation about a given axis and has a number of substantially axially extending blade receiving slots therein located at different distances from said axis, each slot being open at one end to enable a blade to protrude therefrom and being bounded by opposed substantially axially extending widthwise walls adapted to face the faces of a blade received therein and extending widthwise approximately in the circumferential direction in relation to said axis and bounded by opposed substantially axially extending edgewise walls or slot edges adapted to face the edges of the blade.

If the widthwise walls are formed so as to converge towards one another at each side then the edgewise walls may shrink to zero width and the blade may then be driven by the converging margins of the widthwise walls which may be regarded as slot edges and as the equivalent of the edgewise walls.

Preferably each slot is intersected by a bore or passage approximately perpendicular to the widthwise faces of the slot so that if the blade is formed with an appropriately positioned hole it can be retained in the slot (on withdrawal of the tool after a hole has been cut) by a retaining pin inserted in the said bore or passage. In most preferred forms of construction a number of slots are arranged in a row and are intersected by a single radially directed bore or passage but if a number of blade receiving slots are disposed otherwise than in a row they may each be intersected by a separate bore.

A retaining pin or wire for use with a cutter head according to the present invention is preferably formed with a cranked extension at that end which emerges from the bore to provide an arm spaced from and substantially parallel to the body of the pin which enters the bore and the cutter head is preferably provided with a locking notch into which said arm can be sprung for the purpose of locking the pin in position in the bore to enable it to resist withdrawal from the bore under the action of centrifugal force when the head is rotating.

The slots which are open in the axial direction at one end thereof may be closed at the other end or at least provided with an abutment for the inner end of the blade.

The length of each slot taken in the axial direction is preferably substantially greater than the width thereof taken in a direction perpendicular to a radius passing through the slot.

The slots are preferably arcuate in cross-section or approximately so and the centre of curvature of each slot preferably lies on a radius passing through the axis of rotation of the head and through the midwidth of the slot. The blade is preferably of corresponding arcuate cross-section.

A blade for use with a cutterhead according to the present invention comprises a strip of cutting steel longer than its width, bounded widthwise by narrow longitudinal edges and formed with a cutting edge at one end of at least one of said longitudinal edges, the cutting edge extending across the thickness of the blade from one face of the blade to the other and being directed for cutting in the widthwise direction of the blade, said one end of the blade extending from the cutting edge to the other longitudinal edge obliquely towards the other end of the blade. The strip may be say one quarter of an inch wide and about one thirty-second of an inch thick and is preferably of arcuate cross-section from one of its narrow longitudinal edges to the other. In a preferred form of blade the cutting edge is inclined outwardly away from the opposite end of the blade in a direction towards the outside of the circular path in which it cuts. In the case of a blade which is arcuate from one longitudinal edge to the other, the cutting edge is inclined outwardly from its concave face towards its convex face.

The strip of which the blade is comprised may be thickened in the neighborhood of its cutting edge to enable the cutting edge to be longer than the normal thickness of the blade between its faces and the cutting edge preferably extends outwardly beyond both faces to provide, when cutting a circular groove, a clearance between the walls of the cut groove and the faces of the blade behind the cutting edge.

In a particular form of blade suitable especially for the cutting of wood at least one end of the blade is formed with two cutting edges or teeth both directed for cutting in the widthwise direction of the blade, one of said cutting edges being at the end of one of the longitudinal edges of the blade and the second being intermediately between the longitudinal edges of the blade and spaced from the first cutting edge by a notch, the said cutting edges being substantially coincident in the longitudinal direction of the blade.

Preferably all blades according to the invention are formed with an aperture therethrough approximately at the midwidth to enable a locking pin or wire as hereinbefore set forth to pass therethrough.

A single cutter head according to the present invention can be used for cutting holes of various diameters according to the number of slots formed in the head and their spacing from the axis of rotation of the head. For example the cutter head may be formed with a series of blade receiving slots at distances from the axis of rotation of $3/16''$, $1/4''$, $5/16''$, $3/8''$, $7/16''$ and so on up to $15/16''$. Half of the slots say those at radii $3/16''$, $5/16''$, $7/16''$, etc., may be provided at one side of the axis and the others say $1/4''$, $3/8''$, $1/2''$, etc., at the other side of the axis.

Alternatively two sets of slots at like spacings may be provided one at each side of the axis of the head to enable holes to be cut using simultaneously two blades disposed in slots at equal spacings from the axis. If desired two further sets of slots at like spacings intermediate those of the above mentioned sets may be provided one at each side of the axis of the head but on a diameter different from (e.g., at right angles to) that of the above-mentioned sets of slots to enable further holes to be cut using simultaneously two blades disposed in slots at equal spacings from the axis. Or again a cutter head may be provided with three sets of slots at like spacings, each set being disposed on a radius spaced by 120° from the other sets whereby to enable holes to be cut using simultaneously three blades disposed in three slots at equal radii.

Washers may be cut with the aid of a tool of the present invention by using two blades in a single head at different radii or by using two sets of blades at different radii in a single head.

A single cutter head may be supplied with a set of blades having different cross sectional curvatures. For example the cross-sectional curvature of one blade of a set may be of radius 3/16", a second 5/16" and a third 7/16", the first being used for cutting holes of 3/8" diameter, the second for cutting holes of 1/2", 5/8" or 3/4" diameter, and the third for cutting holes of from 7/8" to 1 7/8" diameter.

A cutter head according to the invention may be provided with a shank or spindle at its axis of rotation to enable it to be driven by a rotary drill or alternatively it may be formed with a bore to receive such a shank or spindle. In a preferred form of construction a spindle is secured to the head through the intermediary of a resilient bush whereby to allow for small inaccuracies in the presentation of the cutter head to the work.

The present invention includes not only cutter heads as outlined above but assemblies of cutter heads, cutter blades and retaining pins or wires as hereinbefore described.

The invention is further described by way of example with reference to FIGS. 1 to 9 of the accompanying drawings in which:

FIG. 1 is a side view and FIG. 2 is a sectional front view of a first form of construction;

FIG. 3 is a plan view and FIG. 4 is an inverted plan view corresponding to FIGS. 1 and 2;

FIG. 5 and FIG. 6 are a side view and end view of a blade;

FIGS. 7 and 8 are a plan view and an inverted plan view of a second form of construction;

FIG. 9 is a sectional view corresponding to FIG. 7 and FIG. 8.

FIGS. 10 and 11 are a side view and an inverted plan view illustrating a further form of cutter head;

FIG. 12 is a side view, FIG. 13 an end view, FIG. 14 a perspective view, and FIG. 15 a plan view illustrating a preferred form of blade; and FIG. 16 is a side view, and FIG. 17 a plan view illustrating another form of blade.

The cutter heads illustrated in the drawings are of circular form in plan view and may be formed of relatively inexpensive cast metal such for example as zinc alloy. The cutter head 1 of FIGS. 1, 2 and 4 is formed with a diametral rib 5 and a central axial bore 6 in which to receive a driving spindle 7.

Slots 8 extend substantially axially upwardly from the lower face 9 of the head 1 into the rib 5 at varying radii from the central axis of the head 1. Each slot 8 is bounded by a pair of opposed widthwise or wider walls 10 and a pair of opposed edgewise or narrower walls 11 to face respectively the faces and edges of a blade. In the form of construction illustrated the walls 10 are of cylindrical form but they may alternatively be flat. For the sake of clarity only four slots are shown in the construction of FIGS. 1 to 4, but considerably more than four slots may if desired be provided.

A passage 12 extends radially between each pair of adjacent slots 8 over part of the axial length of the slots 8. The passage 12 may extend over the whole of the axial length of slots 8. The passage 12 arises from the face that a web connects each pair of core elements which are used to form the slots 8 in the casting of the head 1. When more than two slots 8 are provided in a row, webs may be provided between groups of three or even more core elements to form passages 12 between the slots of each group of three or more adjacent slots 8.

A diametral hole 13 is provided on the upper end of the spindle 7. If desired a driving pin may be inserted in the hole 7.

The slots 8 are axially open at their lower ends and closed at their upper ends to provide an abutment for a blade received therein whereby the blade can be pressed onto the work by the closed end of the slot.

One form of blade 15 is illustrated in FIGS. 5 and 6. It is of arcuate cross-section as can be observed from FIG. 6 and has a cutting edge at each end and a hole 16 at the middle. The blade may alternatively be flat if the slots 8 are flat. The width of the blade is about one quarter of an inch and the thickness about one thirty-second of an inch.

The two slots at each side of the bore 6 are intersected by a narrow radial bore 17 in the head. Each bore 17 extends to the outer side surface 18 of the head. Each bore 17 is interrupted by a passage 12. The bore 17 receives a retaining pin 19 which passes through the hole 16 of the blade. Each retaining pin 19 is bent through a right angle at three places 20, 21, 22 to provide an arm 23 spaced from but substantially parallel to the main body of the pin 19 within the bore 17 and to provide at the extreme end of the arm 23 a lug 24 directed towards the main body of the pin 19 within the bore 17. The upper surface of the rib 5 is formed at each side of the bore 6 with chordally directed cam 25 having therein a transverse notch 26 into which the arm 23 can be sprung whereby to hold the pin 19 in position in the bore 17 against the action of centrifugal force. Preferably, the bore 17 is larger than the hole 16 of the blade and disposed in relation thereto so as to enable the pin 19 to hold the blade slightly upwards against the upper end of its slot. The pin 19 is not intended to transmit a cutting thrust from the head to the blade but to prevent withdrawal of the blade from the head as the head is retracted from the work after a hole has been cut.

For the sake of illustration the cutter head is shown in FIG. 2 with four blades in position in the slots but for cutting a hole only one blade would be used. For cutting a washer two blades would be used to describe circles of different radius.

In a modified form of construction two like sets of slots are formed in the rib 5 at opposite sides of the bore 6 so as to provide a number of pairs of slots at opposite sides of the bore 6 equally spaced therefrom whereby to enable a hole to be cut with two blades located at opposite sides of the axis of rotation and equally spaced therefrom.

The cutter head 29 illustrated in FIGS. 7, 8 and 9 is of circular form in plan view and has three upstanding radial ribs 30, 31, 32 into each of which a set of slots 34 arranged in a row project from the lower face 35 of the head. A passage, similar to the passages 12 of FIGS. 2 and 4, would extend between each two or more adjacent slots 34 if the mode of casting the slots 34 were the same as that of the slots 8.

The spacing from the axis of rotation of the slots 34 in the rib 30 is the same as in the ribs 31, 32 so that for cutting a hole of any given diameter three blades can be used simultaneously in equally spaced slots in ribs 30, 31 and 32.

The upper surface of each rib 30, 31, 32 is formed with a chordally directed cam 25 substantially similar to the cams 25 illustrated in FIG. 2. The slots 34 in each rib 30, 31, 32 are intersected by a radially extending bore 17 similar to the bores 17 illustrated in FIG. 2 to receive respectively a retaining pin 19 similar to the retaining pins 19 illustrated in FIG. 2.

The head 29 has a central aperture 40 of conical form to receive a driving spindle 41. A bush 42 of elastic material is interposed between the aperture 40 and the spindle 41 to permit of a limited degree of inaccuracy in the presentation of the spindle to the work.

A lid 45 pivoted about a pivot pin 46 closes a cavity therebeneath in the head which is provided for storage of a set of blades.

The cutterhead illustrated in FIGS. 10 and 11 is in many respects similar to those illustrated in FIGS. 1 to 4 and 7 to 9. It has four radial ribs 5 at right-angles to one another extending from a central boss 50 which rises from a circular base plate 51 having a low upwardly directed flange 52 around its periphery.

Each rib 5 has a set of six axially directed blade receiving slots formed therein at different radii. The slots in the group marked 55 are respectively at the same radii as those in the diametrically opposite group marked 56 whilst the slots in the group marked 57 are respectively of the same radii as those in the group marked 58 but different from those of the groups marked 55 and 56. Thus a hole of given diameter may be cut by using two blades inserted in two slots at the same radius in the groups of slots 55 and 56 or in groups of slots 57 and 58.

Each subgroup of three slots is intersected by a radial passage 59 formed by webs which connect the core elements used in the casting of the slots in the cutterhead. Whereas the continuous widthwise walls 60 of the slots are arcuate, the discontinuous widthwise slot walls 61 are straight but approximately follow an arcuate contour parallel with the slots 60.

The blade 65 illustrated in FIGS. 12 to 15 is of cutting steel strip about a quarter of an inch wide and a thirty-second of an inch thick. It is of arcuate cross-section from one narrow longitudinal edge 66 to the other 67. At the upper end (as viewed in the drawings) of the longitudinal edge 67 the blade 65 has a cutting edge 69. In this region of the blade it is thickened as indicated at 70 so that the cutting edge 69 is longer than the normal thickness of the blade between its arcuate faces. The cutting edge 69 is inclined outwardly away from the opposite end 72 of the blade in a direction from its concave face towards its convex face. The lengthening of the cutting edge 69 by virtue of the thickening 70 of the blade affords clearance between the walls of a groove being cut and the arcuate faces of the blade behind the cutting edge. The inclination of the cutting edge 69 facilitates the final parting of a circular piece being cut from a sheet of material.

The blade 74 illustrated in FIGS. 16 and 17 is particularly suitable for cutting wood. It is formed at the upper end of its longitudinal edge 75 with a cutting edge or tooth 76 and at the same end is formed with a second cutting edge 77 intermediately between the longitudinal edges 75, 78, the two cutting edges being spaced apart by a notch 79 and being substantially coincident in the longitudinal direction of the blade.

I claim:
1. The combination of cutterhead and blade comprising a body adapted for rotation about a given axis and having a number of substantially axially extending blade receiving slots therein located at different distances from said axis, each slot being open at one end to enable a blade to protrude therefrom and being bounded by opposed substantially axially extending widthwise walls adapted to face the faces of a blade and extending widthwise approximately in a circumferential direction in relation to said axis and bounded by opposed substantially axially extending edgewise walls adapted to face the edges of the blade, each slot being intersected by a bore running approximately perpendicular to the widthwise faces of the slot, a retaining pin adapted to be received in said bore, the pin and cutterhead being so formed that the pin can be sprung into a locking position relatively to the head for the purpose of locking it in the bore, a cranked extension being formed on said pin to provide an arm spaced from and substantially parallel to the body of the pin which enters the bore, and a locking notch on said cutterhead into which said arm can be sprung for the purpose of locking the pin in the bore, the blade comprising a strip of cutting steel longer than its width, bounded widthwise by narrow longitudinal edges and formed with a cutting edge at one end of at least one of said longitudinal edges, the cutting edge extending across the thickness of the blade from one face of the blade to the other and being directed for cutting in the widthwise direction of the blade, said one end of the blade extending from the cutting edge to the other longitudinal edge obliquely towards the other end of the blade.

2. The combination of cutterhead and blade comprising a body adapted for rotation about a given axis and having a number of substantially axially extending blade receiving slots therein located at different distances from said axis, each slot being open at one end to enable a blade to protrude therefrom and being bounded by opposed substantially axially extending widthwise walls adapted to face the faces of a blade and extending widthwise approximately in a circumferential direction in relation to said axis and bounded by opposed substantially axially extending edgewise walls adapted to face the edges of the blade, each slot being intersected by a bore running approximately perpendicular to the widthwise faces of the slot, a retaining pin adapted to be received in said bore, the pin and cutterhead being so formed that the pin can be sprung into a locking position relatively to the head for the purpose of locking it in the bore, a cranked extension being formed on said pin to provide an arm spaced from and substantially parallel to the body of the pin which enters the bore, and a locking notch on said cutterhead into which said arm can be sprung for the purpose of locking the pin in the bore, the blade comprising a strip of cutting steel longer than it is wide, of arcuate cross-section from one of its narrow longitudinal edges to the other and formed with a cutting edge at one end of at least one of said longitudinal edges, the cutting edge extending from one face of the blade to the other and being directed for cutting in the widthwise direction of the blade, said one end of the blade extending from the cutting edge to the other longitudinal edge obliquely towards the other end of the blade.

3. A cutterhead comprising a body adapted for rotation about a given axis and having a number of substantially axially extending blade receiving solts therein located at different distances from said axis, each slot being open at one end to enable a blade to protrude therefrom and being bounded by opposed substantially axially extending widthwise walls adapted to face the faces of a blade received therein and extending widthwise approximately in a circumferential direction in relation to said axis and bounded by opposed substantially axially extending edgewise walls or slot edges to face the edges of the blade, each slot being intersected by a bore running approximately perpendicular to the widthwise faces of the slot, a retaining pin adapted to be received in said bore, the pin and cutterhead being so formed that the pin can be sprung into a locking position relatively to the head for the purpose of locking it in the bore, a cranked extension being formed on said pin to provide an arm spaced from and substantially parallel to the body of the pin which enters the bore, and a locking notch on said cutterhead into which said arm can be sprung for the purpose of locking the pin in the bore.

4. A cutterhead according to claim 3 in which the widthwise walls of each slot are substantially perpendicular to the radial direction of the head.

5. A cutterhead according to claim 3 in which the length of each slot taken in the axial direction is substantially greater than the width thereof taken in a direction perpendicular to a radius passing through the slot.

6. A cutterhead according to claim 3 in which the slots are arcuate in cross-section or approximately so.

7. A cutterhead according to claim 3 in which a number of blade receiving slots arranged in a row are intersected by a single bore.

References Cited by the Examiner

UNITED STATES PATENTS

| | | | |
|---|---|---|---|
| 323,860 | 8/1885 | Doyle | 77—79 |
| 1,283,258 | 10/1918 | Misener et al. | 77—69 |
| 1,841,099 | 1/1932 | Faase | 77—79 |
| 2,085,641 | 6/1937 | Davis | 24—100.5 |
| 2,618,992 | 11/1952 | Charles | 77—69 |
| 2,691,396 | 10/1954 | Harrison | 145—35 |
| 2,964,833 | 12/1960 | Novkov | 29—95 |
| 2,979,805 | 4/1961 | Johnson | 29—95 |

FOREIGN PATENTS 22,586    1911    Great Britain.

WILLIAM W. DYER, JR., *Primary Examiner.*

FRANCIS S. HUSAR, *Examiner.*